(12) United States Patent
Vanek et al.

(10) Patent No.: US 12,345,355 B2
(45) Date of Patent: Jul. 1, 2025

(54) AIR RELEASE VALVE MONITORING SYSTEMS AND METHODS

(71) Applicants: Richard J. Vanek, Summerland Key, FL (US); Rodney C. Montrose, Pensacola, FL (US); Donald R. Conner, El Dorado, AR (US)

(72) Inventors: Richard J. Vanek, Summerland Key, FL (US); Rodney C. Montrose, Pensacola, FL (US); Donald R. Conner, El Dorado, AR (US)

( * ) Notice: Subject to any disclaimer, the term of this patent is extended or adjusted under 35 U.S.C. 154(b) by 0 days.

(21) Appl. No.: 17/373,747

(22) Filed: Jul. 12, 2021

(65) Prior Publication Data

US 2022/0065364 A1 Mar. 3, 2022

Related U.S. Application Data

(60) Provisional application No. 63/050,599, filed on Jul. 10, 2020.

(51) Int. Cl.
| | | |
|---|---|---|
| *F16K 37/00* | (2006.01) | |
| *E03F 5/08* | (2006.01) | |
| *G08B 5/22* | (2006.01) | |
| *H04Q 9/00* | (2006.01) | |

(52) U.S. Cl.
CPC ............ *F16K 37/0083* (2013.01); *E03F 5/08* (2013.01); *G08B 5/22* (2013.01); *H04Q 9/00* (2013.01)

(58) Field of Classification Search
CPC .......... F16K 37/0083; E03F 5/08; G08B 5/22; H04Q 9/00

USPC .................................................. 137/551, 559
See application file for complete search history.

(56) References Cited

U.S. PATENT DOCUMENTS

| | | | | |
|---|---|---|---|---|
| 5,329,465 A | * | 7/1994 | Arcella | F16K 37/0083 706/915 |
| 6,276,390 B1 | * | 8/2001 | Perkins | F16K 24/00 137/202 |
| 7,617,838 B2 | * | 11/2009 | Katzman | F16K 24/048 137/430 |
| 9,261,201 B2 | * | 2/2016 | Shoval | F16K 24/04 |
| 9,657,859 B2 | * | 5/2017 | Halvorson | F16K 24/042 |
| 10,352,476 B2 | * | 7/2019 | Aylon | F16K 37/005 |
| 2008/0156121 A1 | * | 7/2008 | Radomsky | F16K 37/0083 137/554 |
| 2013/0085619 A1 | * | 4/2013 | Howard | A01G 25/16 700/284 |
| 2021/0140151 A1 | * | 5/2021 | Johnson | G01M 3/2807 |

FOREIGN PATENT DOCUMENTS

WO    WO-2005026053 A2 *  3/2005  ........... A01G 25/167

* cited by examiner

*Primary Examiner* — Angelisa L. Hicks

(57) ABSTRACT

The present invention relates to systems and methods for automated monitoring of air release valve. The automated monitoring of the air release valve generally includes obtaining at least a first reading from a first sensor coupled to the air release valve, transferring the first reading from the first sensor to an IPCT (information processor and cloud transceiver), processing the first reading from the first sensor in the IPCT to create an output defined as an operating condition of the air release valve and communicating the operating condition of the air release valve across a network and to a server when the reading is flagged.

15 Claims, 6 Drawing Sheets

AIR RELEASE VALVE MONITORING SYSTEMS AND METHODS

CLAIM OF PRIORITY, IDENTIFICATION OF RELATED APPLICATIONS

This Non-Provisional Patent Application claims priority from U.S. Provisional Patent Application No. 63/050,599 filed on Jul. 10, 2020 entitled AUTOMATED MONITORING OF AIR RELEASE VALVE, to common inventors Richard J. Vanek, et al.

TECHNICAL FIELD

The present invention generally relates to air release valve monitoring. More specifically, the present invention relates to systems and methods for automated monitoring of an air release valve.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem

Air release valves (or valves) are present in great numbers in every city and county's water and sewer system in the United States. As an example, New York city has over 4,000 valves in just their sewer system. These valves are supposed to be serviced/cleaned at regular intervals, but most municipalities have trouble keeping up with a maintenance schedule.

Even dedicated crews servicing valves may have units that get clogged with debris from the sewer system or break with pressure surges. And, as one may imagine, when a valve malfunctions, consequences range from minor to serious. One mild consequence could be that a non-functioning valve fails to serve its purpose of venting air/gases out of a pipeline, which can lead to increased corrosive H2S gases within the pipeline that deteriorate metal components in the sewer system.

More important than merely venting bad air out, the valve also allows fresh air in at high points in the sewer system, which prevents air locks that will restrict flow. This is important because when an air lock is present, pumps must work harder to push the fluid through the pipeline. This requires more energy (power consumption) and increases the maintenance needs on the pumps.

In more extreme cases, air locks can stop flow altogether and cause a pipeline to rupture or collapse sending the fluid (including sewer fluids) into the area where the break occurred. When they occur, costly pipeline breaks can receive coverage on the evening news, where a street has washed out or a huge sink hole developed, resulting in poor publicity for the city and area where the break occurs.

Apart from the above problems, one major and common issue is, when the air vent's mechanism is not working correctly and they begin to clog, the valves may leak sewer water and refuge from the air vent.

Accordingly, there exist a need for systems, devices and methods that facilitate towards preventing pipeline breaks otherwise leading to a washed street, formation of huge sink hole and leaking of sink sewer from the air vent due to inoperable mechanisms. However, there is dearth of products or service that provides for application based automated monitoring of air release valves. The present invention overcomes the drawback of spillage and leaking as mentioned in the prior art.

Topically Related Publications

Several automated monitoring systems and methods are known. Some of them are:

US20150013772A1 discloses a method of closing or opening a manual valve coupled to a conduit for e.g., water, comprising receiving a signal indicative of an instruction to close the manual valve, and in response to the signal, removing a barrier provided between a source of stored potential energy and an actuator coupled to the manual valve; and rotating the manual valve using the actuator.

US20130248023A1 discloses a remotely activated fluid control system prevents damage from leaking fluids (such as water or gas) escaping from damaged pipes by providing a user-activated controlling device that allows the user to activate a remote inline first shut-off valve in the main fluid supply line, such as when leaving the building.

US20120026004A1 discloses a method for monitoring a home for a leak within a home network that includes at least one water meter for measuring water consumed by water consuming devices within the network and a central controller communicatively linked to the at least one water meter, the central controller including at least one memory for storing executable instructions.

SUMMARY

The present invention relates to monitoring of air release valve towards study of sequentially displayed values in relation to combination of air release and/or vacuum and/or pressure valves, and further to detection of any water leakage.

In an aspect of the present invention, an air release valve monitoring system is disclosed. The air release valve monitoring system comprises an air release valve assembly, an IPCT (Information Processor and Cloud Transceiver) coupled to the air release valve assembly and a server. The air release valve assembly comprises an air release valve and at least a first sensor connected to the air release valve, wherein the first sensor is coupled to the air release valve assembly at an angle ranging between 22 and 45 degrees to vertical. The air release valve comprises a housing having a float, a guide barrel, a nozzle seat, and a sealing cap for the nozzle seat. The first sensor is adapted to monitor at least one physical characteristic of the air release valve.

The IPCT obtains at least a first reading from the at least first sensor, processes the first reading from the at least first sensor and compares the first reading with a prestored value. The IPCT further flags the first reading when the first reading is outside the prestored value. The flagged reading represents warnings related to unsafe operation that is transmitted to a user device via a communication network.

The server, that is in communication with the IPCT across a network, receives the first reading, and processes the first reading. The server is adapted to generate a first notification for communication to at least a first user device.

In accordance with various embodiments of the present invention, the first sensor is a moisture sensor or a water sensor or a pressure sensor.

The air release monitoring system further comprises a second sensor, the second sensor being a pressure sensor, a third sensor, the third sensor being either a temperature sensor or a flow sensor and a location-determining device.

The air release monitoring system receives a moisture data, a pressure data, and a location data in the IPCT and communicates the moisture data, pressure data and location data to the server across the network.

In another aspect of the present invention, a method for monitoring an air release valve is disclosed. The method obtains at least a first reading from a first sensor that is coupled to an air release valve and transfers the first reading from the first sensor to an IPCT (information processor and cloud transceiver). The method further processes the first reading from the first sensor in the IPCT to create an output defined as an operating condition of the air release valve and communicates the operating condition of the air release valve across a network and to a server when the reading is flagged. The flagged reading is transmitted across a network and to a user device. The server generates a notification for at least a first technician and sends the notification to the user device associated with the first technician.

In accordance with various embodiments of the present invention, the method obtains a location-based data associated with the air release valve, and communicates the location-based data to the server when a reading is sent to the server. Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT

Interpretation Considerations

Figure 1:
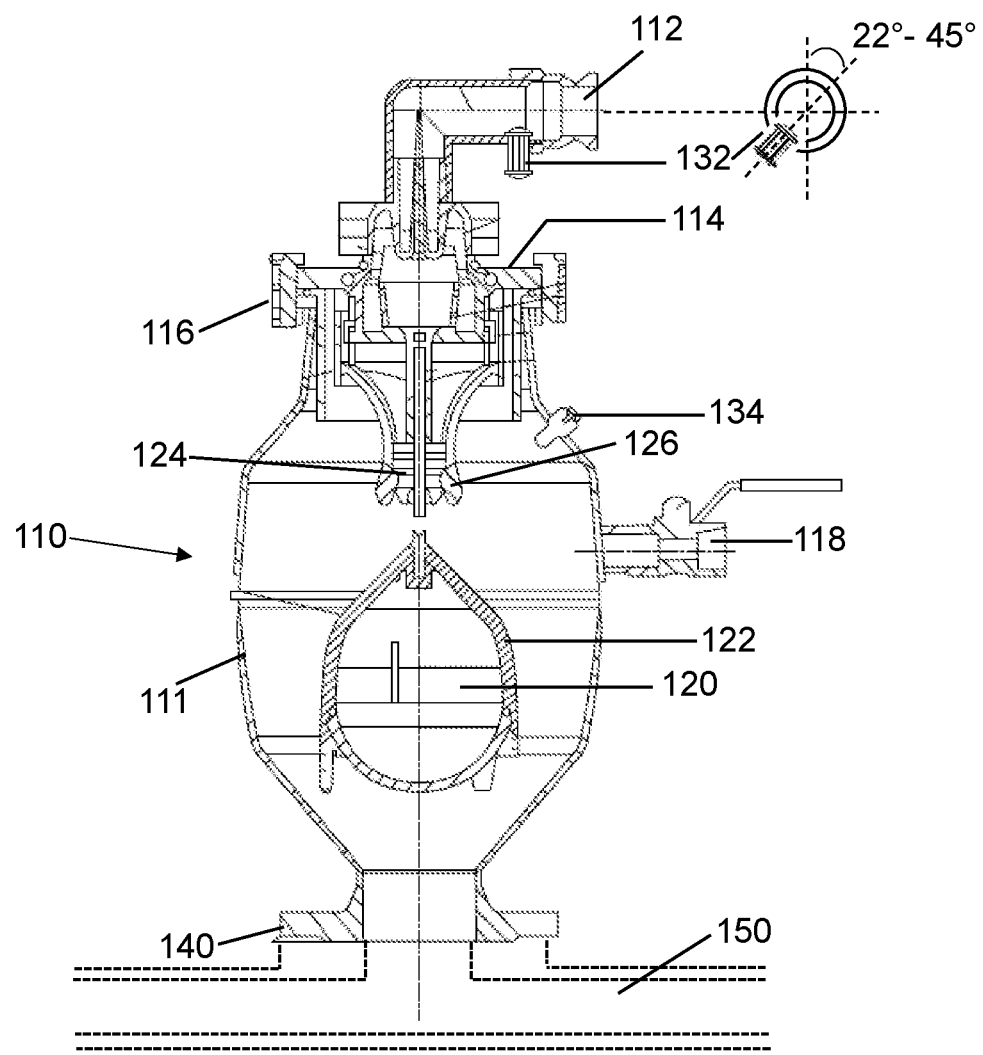
FIG. 1 illustrates an air release valve assembly coupled to a pipeline.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

Description of the Drawings, a Preferred Embodiment

The present invention generally relates to systems and methods for automated monitoring of an air release valve. The terms "air release valve" and "valve" may interchangeably be used throughout the present invention.

With the procurement of present invention, municipalities will be greatly benefited from an inexpensive remote monitoring system that can be installed at each valve to independently monitor, and check for proper functioning of air release valves (or valves) and trigger an alert the moment, operation is compromised. By continuous monitoring of values of environmental parameters such as pressure, moisture and temperature, for example, it can be confirmed that the valve has efficient functioning. For example, monitoring can be done by mounting of a sensor, a water detect sensor, for example, and by setting a sensitivity level. If the water level increases from the set sensitivity level, then it leads to leakage.

Upon leakage of water, a message is sent to a cloud service. The cloud service records the starting of the leakage and can send a text, e-mail, or voice notification to owner, person responsible or technician. When the water is no longer detected, the same is sent to the cloud service, which determines the time period of the water, and can send a text, e-mail, or voice notification to the owner, person responsible or technician that the leak has stopped after a period of time.

Advantageously, the above features eliminate guesswork as to which of the 100's of valves associated with a set of pumps may be clogged when the operator sees rpm spikes on the pumps or other indicators the pump is pushing against an air lock or clog in the system. An alert will indicate the duration of the leak and location of the valve, so crews can respond immediately rather than driving around in search of the problematic valve.

Another benefit of an independent remote monitoring system on each valve is the ability to monitor the pressure within the valve. Previously conducted studies show that the pressure within the air release valves closely resembles the pressure within a pipeline. Being alerted of a pressure differential between two valves gives the technician to quickly identify the location of a potential problem within the pipeline itself, saving costly exploratory inspections.

Further, the present invention may operate in a gaseous environment, such as high H2S gas, for example.

FIG. 1 illustrates an air release valve assembly 100 coupled to a pipeline 150 (shown in dashed lines). In operation, the air release valve assembly 100 is adapted to release air that becomes trapped at generally predictable locations in a pipeline, as is known to those of ordinary skill in the municipal and industrial water supply arts (hereinafter "the arts"). Accordingly, the pipeline 150 may be a part of a waterline, a sewer line, an oil pipeline, a gas pipeline, or any other liquid pipeline used in a municipality/city, an industry/plant, or a large vessel such as an ocean-going transport.

The air release valve assembly 100 typically comprises an air release valve 110 shown coupled to the pipeline 150 via a valve connector 140 and a plurality of sensors (described below) for monitoring various physical characteristics of the air release valve 110 and the air and liquid in it. The plurality of sensors monitors physical states and characteristics of the air and fluids in the air release valve 110, and this data is used to infer the status or state of the air release valve 110. Valve connectors such as the valve connector 140 are known to those of ordinary skill in the arts, as are their manner of coupling between the air release valve and the pipeline (including open loop and closed loop pipe systems).

With specific reference to the air release valve 110, the size and type of the air release valve 110 may be selected based on the area of application of the air release valve as well as the type of fluid flowing inside the pipeline 150. In an example, the air release valve 110 may be one of an air/vacuum valve and a combination air valve to combine the function of both the air release valve and the air/vacuum valve, wherein the valve is constructed according to American Water Works Association standard C512-15. In another example, the air release valve 110 may be one of a simple lever air release, a compound lever air release valve and a vacuum breaker air inlet valve.

The air release valve 110 generally comprises a housing 111, exterior elements, and interior functional elements. The interior functional elements for the air release valve 110 shown in FIG. 1 include a float 120, a guide barrel 122, a nozzle seat 124, and a sealing cap 126 for the nozzle seat 124. Further, the housing 111 of the air release valve has a cover 114 and a manual pressure exhaust 118 that is used to release air pressure (or fluid pressure) inside the air release valve 110. The specific mechanical characteristics and operations of the interior functional elements are known to those of ordinary skill in the arts.

The exterior elements of the air release valve 110 include a bonnet 116 and the cover 114 mounted to the housing 111. The housing 111 preferably includes a biasing means (not shown, and understood by those of skill in the arts). The bonnet 116 of the air release valve 110 leads to an outlet 112, which is adapted to discharge air or a mixture of air and fluid that is forced from the pipeline 150 when under pressure.

In one scenario known in the arts, air dissolved in a fluid flowing inside the pipeline 150 collects at joints and creates air pockets. Due to creation of the air pockets, less fluid can flow inside the pipeline 150. An air release valve, such as a dynamic air release valve, is placed where these air pockets may form. In normal operation, the air vents through the air release valve outlet (or outlet) 112.

However, when liquid (or fluid) flow pressure is high, the liquid flows into the air release valve 110, and the water pressure lifts the float 120. The lifted float 120 then plugs the nozzle seat 124 and prevents the further flow of the fluid to the outlet 112. In this way, liquid spillage is avoided. The closure of the air path to outlet 112 forces air and fluid to remain in the air release valve, under increasing pressure. As the internal pressure increases and more air accumulates in the air release valve 110, the air accumulates in a top portion of the housing 111 and the water level falls (albeit, under pressure). As the float 120 lowers with the falling water level, the air path to the outlet 112 is again opened and the trapped air vents to the atmosphere.

Those of skill in the arts understand the relationship between the buoyancy of the float 120 and the internal pressures of the housing 111 and air release valve 110.

Figure 1A:
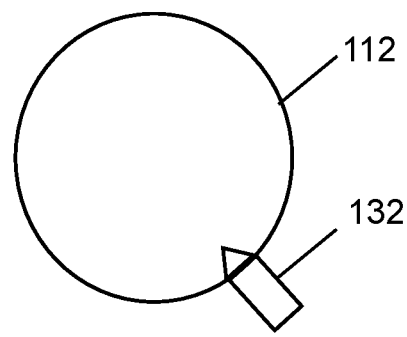
FIG. 1A illustrates the air release valve assembly having a first sensor mounted on an outlet at an angle.

The plurality of sensors (such as a first sensor, a second sensor, a third sensor and so on so forth) provided on the air release valve assembly 100 may include but not limited to a first sensor 132 and a second sensor 134. The first sensor 132 is shown mounted on the outlet 112 of the air release valve 110, while the second sensor 134 is shown mounted to a top portion of the housing 111. In an embodiment, a sensor is coupled to the manual pressure exhaust 118. Operationally, the first sensor 132 detects the presence of the fluid on the outlet 112. The first sensor 132 may be positioned at an angle to reduce false detection/alarm condition as illustrated in FIG. 1 and FIG. 1A. Preferably, the first sensor 132 is positioned at an angle ranging between 22 and 45 degrees to vertical degrees in some vents to avoid condensation or water buildup on the bottom of sensor, triggering the sensor. This is typically not required in Air Valves incorporating a drain on the vent.

The first sensor 132 is preferably a water detection sensor, a moisture sensor, a leakage detector/sensor, or a humidity sensor, for example. More preferably, the first sensor 132 is a SSTOptoMax LLxxx0D3x, such as the LLC510D3.

The second sensor 134 detects changes in the pressure inside the air release valve 110 and may also detect relative and absolute pressures. The second sensor 134 is preferably a pressure sensor such as a piezo electric element, a strain gauge, a potentiometer, or a silicon diaphragm, for example. More preferably, the second sensor is a MicroSensor MPM281 series part, such as MPM28112S0L1.

In alternative embodiments of the present invention, the first sensor 132 and the second sensor 134 may be co-located in the air valve assembly 100. In other embodiments of the present invention, the plurality of sensors may comprise a temperature sensor, a flow sensor, a humidity sensor, a metal expansion sensor, a vibration sensor, a smoke sensor, a fog sensor, a gas sensor, for example. In yet other alternative embodiments of the present invention, a single sensor is used to monitor and detect a single physical state, such as moisture, for example.

Figure 2:
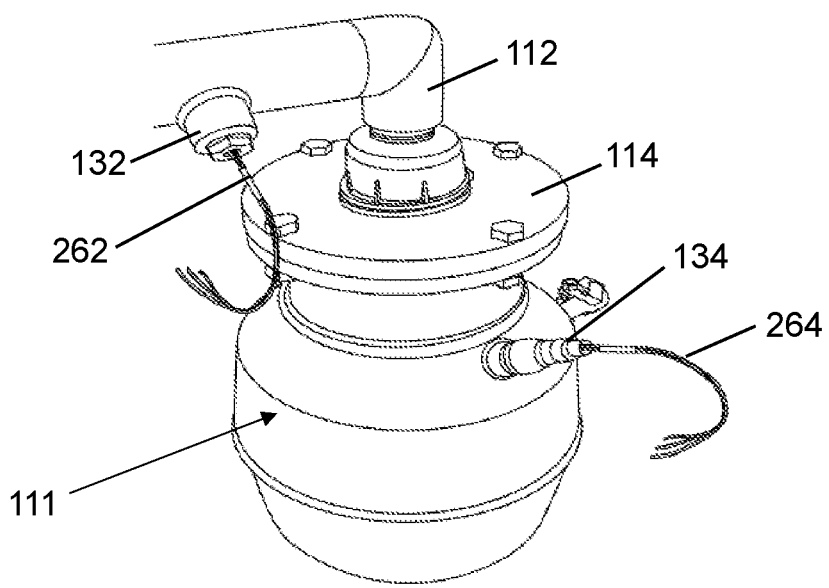
FIG. 2 illustrates the air release valve assembly having the first sensor mounted on the outlet and a second sensor mounted in a housing.

FIG. 2 illustrates the air release valve assembly 100 having the first sensor 132 mounted on the outlet 112, and the second sensor 134 mounted in the housing 111. A communication path for the first sensor 132 is provided in the form of a first cable 262, while a communication path for the second sensor 134 is provided in the form of a second cable 264. In alternative embodiments of the present invention, the (reading) communication path may be a wire or a cable, an optical fiber, or a wireless communication path. Examples of wireless communications include Wi-Fi, cellular networks including analog and data networks, Bluetooth, or Near Field Communication (NFC).

Figure 3:
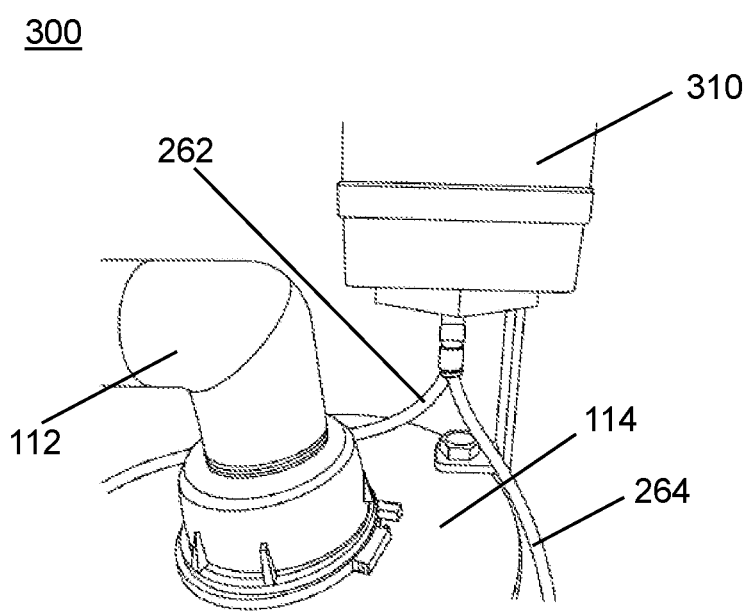
FIG. 3 illustrates an air release valve information processor and cloud transceiver ("IPCT").

FIG. 3 illustrates an air release valve information processor and cloud transceiver ("IPCT") 310 coupled to the air release valve assembly 100 via the communication paths 262, 264. The IPCT 310 comprises a processor such as a PLC (programmable logical controller) or microprocessor that receives and analyzes the reading(s) provided by the sensor(s), as well as a transceiver.

In other words, the processor is preferably the PLC or microprocessor that receives and analyzes the reading(s) provided by the sensor(s). Similarly, the transceiver communicates with a server such as a remote server like a cloud server—preferably wirelessly across a network as shown and described in FIG. 4. A preferred transceiver is a SIMCOM SIM7000A.

The IPCT 310 may use a reading from a sensor to identify the presence of moisture or water in the outlet 112, to identify high pressure inside the air release valve housing 111, or a variety of other readings. The combination of readings from multiple sensors can provide additional insights. One preferred IPCT is the Reign Guage™ from Reign RMC™.

Figure 4:
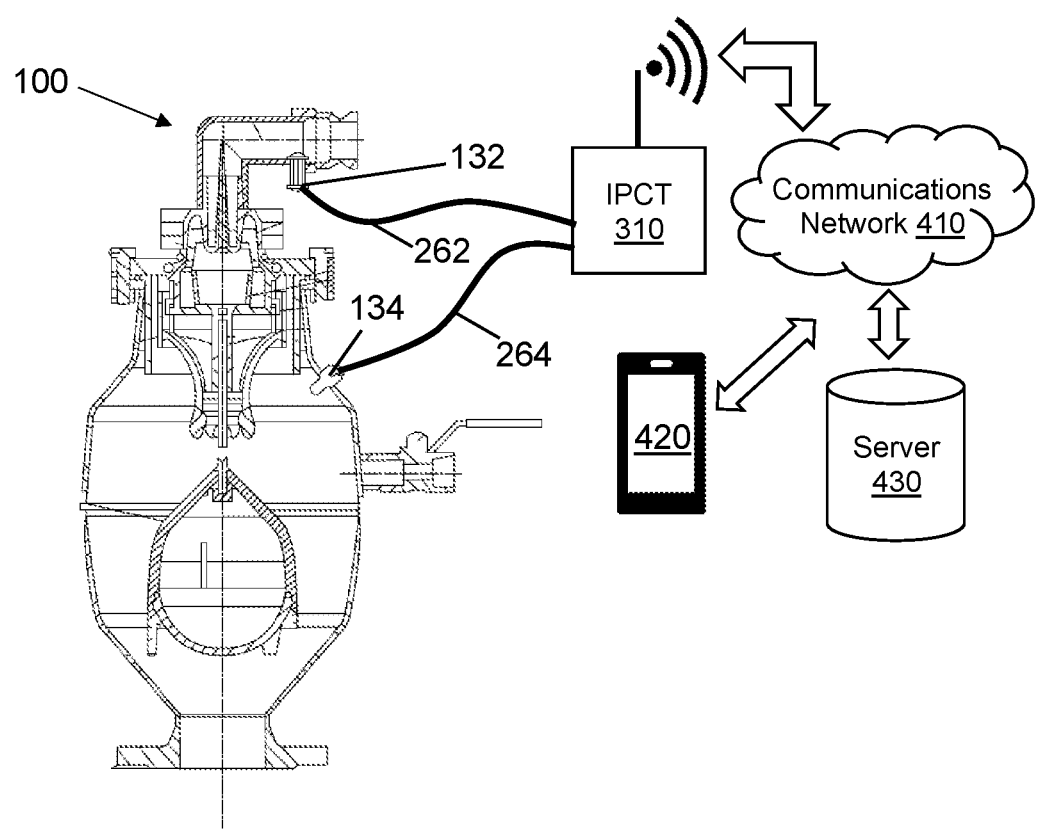
FIG. 4 illustrates an air release valve monitoring system that uses sensor readings to detect air release valve failures, critical or dangerous conditions as well as safe valve operation in the pipeline.

FIG. 4 illustrates an air release valve monitoring system ("monitoring system") 400. The monitoring system 400 generally comprises the air release valve assembly 100, the IPCT 310, a communications network 410, a user device 420, and a server 430. The monitoring system 400 uses sensor readings of air/water/liquid physical states and characteristics to detect air release valve failures, critical or dangerous conditions, as well as safe valve operation.

In one embodiment, the monitoring system 400 processes the readings obtained from the first sensor 132 (first reading from the first sensor) and the second sensor 134 (second reading from the second sensor) and transmits these readings to the server 430 for processing. The IPCT 310 establishes communications with the server 430 and the user device 420 through the communications network 410 that preferably implements wireless communications. The wireless communications networks include Third-Generation Networks (3G), Long Term Evolution (LTE), Fifth Generation Networks (5G), Wi-Fi networks and Long Range (LoRa) networks, for example. In alternative embodiments, the communications network 410 comprises wireline and/or fiber-optic based communications and data transmission.

If a reading is flagged by the IPCT 310, the flagged reading is then transmitted across the communications network 410 to the server 430.

The server 430 or the IPCT 310 send readings, statuses, warnings, and other data to the user device 420. The user device 420 is typically a portable electronic device that can communicate with the server 430, through the network 410, such as a laptop, smart phone, tablet, portable computer, pager or any other computing device including similar hardened and field-specific devices.

Simultaneous reference is now made to FIG. 3 and FIG. 4. In one embodiment, values associated with safe functioning, threshold range(s), and unsafe conditions are stored or loaded to the IPCT 310 in real time. A reading outside of a desired/prestored value is flagged by the processor in the IPCT 310. After flagging, the IPCT 310 sends one or more sensor readings, statuses, warnings or other data to the server 430 and/or the user device 420.

Alternatively, the IPCT 310 stores a temporal (time tagged) recording of the one or more sensor readings. The time tagged recorded readings may be compared with the threshold range(s) to detect unsafe operating conditions of the air release valve, by the processor in the IPCT 310. After the comparison, the one or more sensor readings, along with their respective time tags may be sent to the server 430 and/or the user device 420. Herein, the time tagged reading of the plurality of sensors ensures reduction of false warning generation by the monitoring system.

In yet another alternative, the comparison of values is done at both the IPCT 310 and Server 430. A IPCT level is specified on 430, which sends it to the IPCT 310, and the IPCT 310 does the comparison internally. The readings (including preferably the periodic readings) can also be compared to levels just on the Server 430, and alerts generated by that. Typically, local monitoring and alerts are for pressure, temperature, gas levels, and less so for the water detect.

Alternatively, the IPCT 310 sends the one or more sensor readings, statues, warnings or other data to the server 430 and/or the user device 420 at a predetermined interval of time. The IPCT 310 may send readings from all of the plurality of sensors present in the air release valve assembly at a predetermined interval, to notify all operating conditions of the air release valve (ARV) to the server and/or the user device. Further, the IPCT 310 may combine the readings from the plurality of sensors with the time at which the readings were recorded by the plurality of sensors, and then send the combined reading to the server and/or the user device at a predetermined interval of time.

Further, the IPCT 310 may provide the location of the air release valve to the server 430. The IPCT 310 may use a location-determining device. In an embodiment of the present invention, a global positioning system (GPS) may be provided with the air release valve assembly 100 or integrated into the IPCT 310. Alternatively, the air release valve may be geo tagged to determine the location-based information of the air release valve 110.

Accordingly, the server is adapted to generate a first notification for communication to at least a first user device.

Of course, although reference is made to monitoring a single ARV having a single IPCT associated therewith, it is understood and appreciated by those of ordinary skill in the arts upon reading this disclosure that multiple ARVs may attach to or otherwise communicate with a single IPCT. Further, many ARSs and IPCTs operating independently and/or in conjunction with each other may be communicatively coupled to one or more networks. In turn, the network(s) may have one or more servers, as well as multiple user devices.

Figure 5:
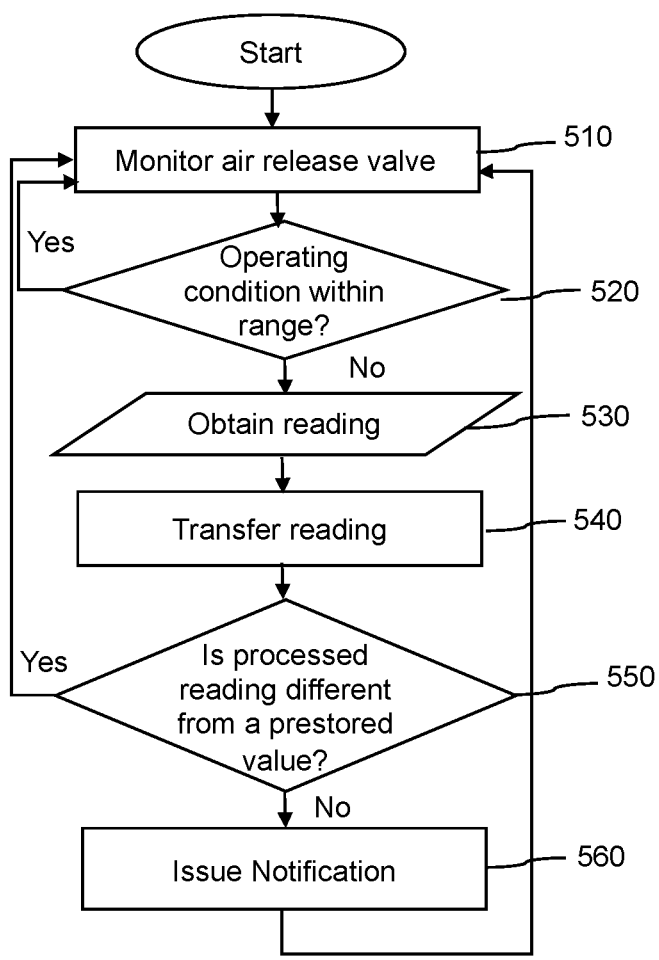
FIG. 5 is a flow-chart of an air release valve monitoring algorithm/method.

FIG. 5 is a flow-chart of an air release valve monitoring algorithm/method ("the Monitoring Algorithm") 500.

The Monitoring Algorithm 500 begins in a Monitor ARV Act 510, in which the plurality of sensors coupled to the air release valve is read for readings of physical characteristics of air, moisture, temperature, pressure, for example. Alternatively, the Monitor ARV Act 510 may comprise a 'steady state' where the monitoring algorithm 500 awaits the receipt of a reading as a discrete packet(s) of data.

Following the Monitor ARV Act 510, an Operating Condition Query 520 begins. The Operating Condition Query 520 asks if the reading obtained indicates that the ARV is operating safely based on the data received. If the physical characteristic(s) of the reading are within a safe operating range, as indicated by the "Yes" path, then the Monitoring Algorithm 500 returns to the Monitor ARV Act 510.

If, however the reading analyzed in the Operating Condition Query 520 is outside of a safe range, then the ARV may not be operating correctly, and the Monitoring Algorithm 500 proceeds along the "No" path to an Obtain Reading Act 530.

In the Obtain Reading Act 530, the IPCT 310 obtains at least one reading from at least one sensor. The at least one reading may again be analyzed, and/or transferred to a host for additional processing in a Transfer Reading Act 540. In the Transfer Reading Act 540, the at least one reading is communicated across the communications network to the server.

Next, in a Comparison Query 550, the processed reading is compared to ranges of desirable readings and undesirable readings. If the reading is a desired range of values (or a prestored value), then the Monitoring Algorithm 500 returns to the Monitor ARV Act 510 as indicated by the "Yes" path. However, if in the Comparison Query 550, the reading is not in the desired range of values, then the Monitoring Algorithm 500 proceeds to an Issue Notification Act 560 as indicated by the "No" path.

In a preferred embodiment of the Issue Notification Act 560, a notification (asynchronous message) is sent to server 430, and server 430 sends the notification to device 420. Alternatively, a notification may be sent across the communications network to the user device 420, which is typically located with a technician, manager, or plant operator so that they may direct further attention to the specific ARV being monitored. Then the Monitoring Algorithm 500 returns to the Monitor ARV Act 510 and resumes monitoring the ARV.

Figure 6:
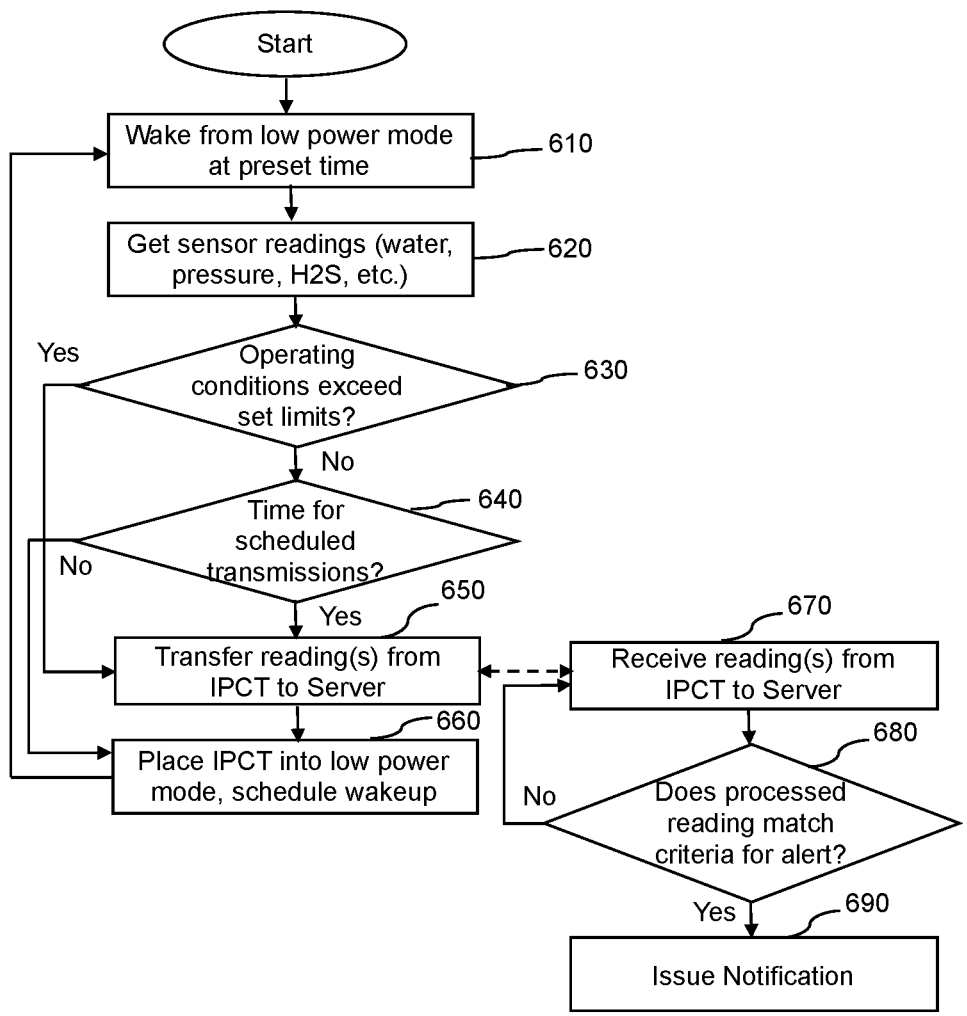
FIG. 6 is a flow-chart of an air release valve monitoring algorithm/method ("the Time-Based Monitoring Algorithm").

FIG. 6 is a flow-chart of an air release valve monitoring algorithm/method ("the Time-Based Monitoring Algorithm") 600.

The Time-Based Monitoring Algorithm 600 begins in a Wake Act 610, in which the IPCT 310 wakes from a low power mode at a preset time or after a predetermined time interval. Alternatively, the Wake Act 610 may comprise a low power 'steady state' where the Time-Based Monitoring Algorithm 600 awaits the receipt of a reading as a discrete packet(s) of data.

Next, in a Get Sensor Readings Act 620, a plurality of sensors coupled to the air release valve are read for readings of physical characteristics of air, moisture, temperature, pressure, for example.

Following the Get Sensor Readings Act 620, an Operating Condition Query 630 begins. The Operating Condition Query 630 asks if the reading obtained indicates that the ARV is operating safely based on the data received. If the physical characteristic(s) of the reading exceed a safe operating range, as indicated by the "Yes" path, then the Time-Based Monitoring Algorithm 600 jumps to a Transfer Readings Act 650 (discussed below).

If, however the reading analyzed in the Operating Condition Query 630 is within of a safe range, then the Time-Based Monitoring Algorithm 600 proceeds along the "No" ("not exceeded") path to a Scheduled Transmissions Query 640.

The Transmissions Query 640 asks if it is the appropriate time for a transmission. If it is NOT the appropriate time for a transmission, as indicated by the "No" path, then the Time-Based Monitoring Algorithm 600 jumps to a Low Power Act 660 (described below).

If, however it is the appropriate time for a transmission in the Transmissions Query 640, then the Time-Based Monitoring Algorithm 600 proceeds along the "Yes" path to a Transfer Readings Act 650.

In the Low Power Act 660, the IPCT 310 is placed in a low power rest state, which conserves energy. Then the Time-Based Monitoring Algorithm 600 returns to the Wake Act 610.

At the Cloud Server, in a Receive Readings Act 570, the Cloud Server receives readings from the IPCT 310 comprising at least one reading from at least one sensor. Next, a Matching Query 680 begins. The Matching Query 680 asks if the reading(s) received match criteria that indicate that the ARV is NOT operating safely. If the physical characteristic(s) of the reading are within an ALERT operating range, as indicated by the "Yes" path, then the Time-Based Monitoring Algorithm 600 issues an alert notification in an Issue Notification Act 690.

If, however the reading analyzed in the Matching Query 680 is within a safe range, and the Time-Based Monitoring Algorithm 600 proceeds along the "No" path to return to the Receive Reading(s) Act 670.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. An air release valve monitoring system, comprising:
    an air release valve assembly, the air release valve assembly comprising:
        an air release valve, wherein the air release valve comprises a housing having a float, a guide barrel, a nozzle seat, and a sealing cap for the nozzle seat, wherein the housing of the air release valve has a cover and a manual pressure exhaust that is used to release air pressure inside the air release valve;
        wherein the air release valve includes a bonnet and the cover mounted to the housing, wherein the bonnet of the air release valve leads to an air release valve outlet, which is adapted to discharge air or a mixture of air and liquid that is forced from a pipeline when under pressure; and
        wherein when flow pressure of liquid is high, the liquid flows into the air release valve, water pressure lifts the float, the lifted float then plugs the nozzle seat and prevents a further flow of the liquid to the air release valve outlet, so as to avoid a liquid spillage in the air release valve assembly;
    a first sensor connected to the air release valve, wherein the first sensor is adapted to monitor at least one physical characteristic of the air release valve and the air and the liquid in the air release valve, wherein the air release valve is coupled to the pipeline via a valve connector, wherein the first sensor is coupled to the air release valve assembly at an angle ranging between 22 and 45 degrees to vertical at an air vent to avoid condensation or water buildup on a bottom of the first sensor;
    an IPCT (information processor and cloud transceiver) coupled to the air release valve assembly;
    wherein the IPCT:
        obtains a first reading from the first sensor,
        processes the first reading from the first sensor and compares the first reading with a prestored value, flags the first reading when the first reading is outside the prestored value, and sends the first reading to a server;

the server in communication with the IPCT across a communication network, the server receiving the first reading from the IPCT, and processing the first reading; and the server is adapted to generate a first notification based on the processing, the first notification for communication to a user device.

2. The air release valve monitoring system of claim 1, wherein the flagged reading represents warnings related to unsafe operation that is transmitted to the user device via a communication network.

3. The air release valve monitoring system of claim 1, wherein the first sensor is at least one of: a moisture sensor, a water sensor, and a pressure sensor.

4. The air release valve monitoring system of claim 1, wherein the IPCT obtains the first reading from the first sensor after waking up from a low power mode at a preset time or after a predetermined time interval.

5. The air release valve monitoring system of claim 1, wherein the IPCT is placed into a lower power mode and is scheduled for wakeup once the IPCT has sent the first reading to the server.

6. The air release monitoring system of claim 1 further comprising a second sensor, the second sensor being a pressure sensor.

7. The air release monitoring system of claim 1 further comprising a third sensor, the third sensor being either a temperature sensor or a flow sensor.

8. The air release valve monitoring system of claim 1 further comprising a location-determining device to provide a location-based data associated with the air release valve, wherein the location-determining device communicates the location-based data to the server when the first reading is sent to the server.

9. The air release monitoring system of claim 1, wherein:

the IPCT receives a moisture data, a pressure data, and a location data; and the IPCT communicates the moisture data, pressure data and location data to the server across the communication network.

10. The air release valve monitoring system of claim 1, wherein a closure of an air path to the air release valve outlet forces the air and the liquid to remain in the air release valve, under increasing pressure, wherein as an internal pressure increases and air accumulates in the air release valve, the air accumulates in a top portion of the housing and the water level falls under the pressure, wherein as the float lowers with the falling water level, an air path to the air release valve outlet is again opened and trapped air vents to an atmosphere.

11. The air release valve monitoring system of claim 1, wherein the first sensor is mounted on the air release valve outlet of the air release valve, while a second sensor is mounted to a top portion of the housing.

12. A method for monitoring an air release valve, the method comprising:

obtaining a first reading from a first sensor, the first sensor being coupled to an air release valve, wherein the air release valve comprises a housing having a float, a guide barrel, a nozzle seat, and a sealing cap for the nozzle seat, wherein the housing of the air release valve has a cover and a manual pressure exhaust that is used to release air pressure inside the air release valve;

wherein the air release valve includes a bonnet and the cover mounted to the housing, wherein the bonnet of the air release valve leads to an air release valve outlet, which is adapted to discharge air or a mixture of air and liquid that is force from a pipeline when under pressure;

wherein when flow pressure of liquid is high, the liquid flows into the air release valve, water pressure lifts the float, the lifted float then plugs the nozzle seat and prevents a further flow of the liquid to the air release valve outlet, so at to avoid a liquid spillage in the air release valve assembly; and where the first sensor connected to the air release valve assembly at an angle ranging between 22 and 45 degrees to vertical at an air vent to avoid condensation or water buildup on a bottom of the first sensor, transferring the first reading from the first sensor to an IPCT (information processor and cloud transceiver), wherein the IPCT obtains the first reading from the first sensor after waking up from a low power mode at a preset time or after a predetermined time interval;

processing the first reading from the first sensor in the IPCT to create an output defined as an operating condition of the air release valve; and communicating the operating condition of the air release valve across a communication network and to a server when the reading is flagged.

13. The method of claim 12, wherein the flagged reading is transmitted across the communication network and to a user device.

14. The method of claim 12 further comprising obtaining a location-based data associated with the air release valve, and communicating the location-based data to the server when a reading is sent to the server.

15. The method of claim 12, wherein the server generates a notification for a technician and sends the notification to a user device associated with the technician.

* * * * *